(12) United States Patent
Lee

(10) Patent No.: US 9,779,734 B2
(45) Date of Patent: Oct. 3, 2017

(54) SPEECH RECOGNITION SYSTEM AND METHOD FOR RECOGNIZING A COMMAND TO CONTROL A TARGET

(71) Applicant: Samsung Electronics Co., Ltd., Suwon-si (KR)

(72) Inventor: Hoshik Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 14/674,531

(22) Filed: Mar. 31, 2015

(65) Prior Publication Data

US 2015/0279356 A1 Oct. 1, 2015

(30) Foreign Application Priority Data

Mar. 31, 2014 (KR) ........................ 10-2014-0038075

(51) Int. Cl.
*G10L 15/08* (2006.01)
*G10L 17/22* (2013.01)
*G10L 15/24* (2013.01)
*G10L 15/20* (2006.01)

(52) U.S. Cl.
CPC .............. *G10L 15/24* (2013.01); *G10L 15/20* (2013.01)

(58) Field of Classification Search
None
See application file for complete search history.

(56) References Cited

U.S. PATENT DOCUMENTS

| 8,014,722 | B2 | 9/2011 | Abel et al. | |
|---|---|---|---|---|
| 2012/0244889 | A1* | 9/2012 | Nomachi | G01C 21/20 455/457 |
| 2013/0073293 | A1* | 3/2013 | Jang | G10L 15/22 704/275 |
| 2013/0183944 | A1 | 7/2013 | Mozer et al. | |
| 2014/0188484 | A1* | 7/2014 | Huang | G06F 3/0481 704/275 |
| 2015/0032456 | A1* | 1/2015 | Wait | G10L 15/26 704/275 |

FOREIGN PATENT DOCUMENTS

| KR | 1992-0003797 A | 2/1992 |
|---|---|---|
| KR | 10-0728620 B1 | 6/2007 |
| KR | 10-1068120 B1 | 9/2011 |
| KR | 10-2011-0139797 A | 12/2011 |

* cited by examiner

*Primary Examiner* — Qian Yang
(74) *Attorney, Agent, or Firm* — NSIP Law

(57) ABSTRACT

A speech recognition server and method are provided. The speech recognition server includes: a network connector configured to connect to terminals through a communication network, and a processor configured to calculate times of arrival of a speech sound at each of the terminals using the speech signals received from each of the terminals, calculate distances between a user and the terminals based on the times of arrival of the speech sound to each of the terminals, and recognize a command to control a target by integrating speech recognition results obtained from the speech signals using a weighted value determined based on the distances.

21 Claims, 18 Drawing Sheets

SPEECH RECOGNITION SYSTEM AND METHOD FOR RECOGNIZING A COMMAND TO CONTROL A TARGET

CROSS-REFERENCE TO RELATED APPLICATION(S)

This application claims the benefit under 35 USC 119(a) of Korean Patent Application No. 10-2014-0038075, filed on Mar. 31, 2014, in the Korean Intellectual Property Office, the entire disclosure of which is incorporated herein by reference for all purposes.

BACKGROUND

1. Field

The following description relates generally to a speech recognition technology. More particularly, the following description relates to a speech recognition technology for improving recognition accuracy of speech commands for device control.

2. Description of Related Art

In indoor spaces such as homes or offices, there may generally be many types of devices such as home appliances, multimedia devices, and information appliances, which are controlled by users in relatively small spaces. In such small places it is cumbersome and uncomfortable for users to manipulate each and every control component of those devices and appliances. Accordingly, wired or wireless remote control components are provided to enable users to control the devices and appliances without directly touching them. Such remote control components may usually be operated by touching or pressing the components with the users' fingers. More recent technologies suggest using voices, rather than the users' fingers, to control the devices and appliances, thereby eliminating the need to press buttons or touch screens. Therefore, a speech recognition technology is basically recommended for recognizing the users' speech as commands for device control.

In the current speech recognition technology, there is a problem in that accuracy of speech recognition is decreased significantly as a distance between a user and a target device to be controlled by the user's speech increases. That is, a user's speech commands made near a target device is recognized relatively accurately, while speech commands made remotely from the target device may be recognized with insufficient accuracy to control the device. A user may feel inconvenience if required to be near a target device all the time for speech recognition, thereby hindering development of speech-recognition control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a speech recognition server, including: a network connector configured to connect to terminals through a communication network, a processor configured to calculate times of arrival of a speech sound at each of the terminals using speech signals received from each of the terminals, calculate distances between a user and the terminals based on the times of arrival of the speech sound to each of the terminals, and recognize a command to control a target by integrating speech recognition results obtained from the speech signals using a weighted value determined based on the distances.

The server may transmit the command to the target.

The server may be configured to: determine a number of targets; when there is a single target, transmit the command to the single target; and when there are a plurality of targets, select one of the terminals to provide a user interface to display information related to the plurality of targets and to enable a user to select the target, and to transmit the command to the target according to the user's selection through the user interface.

The server may be configured to select one of the terminals as the target.

The server is further configured to select a terminal that is positioned at a nearest location from the user as an interface terminal.

The user interface of the selected terminal may be either a visual or an acoustic interface.

The server is further configured to receive a location of each of the terminals after each of the terminals is connected to the server.

The server is further configured to receive information on a changed location of each of the terminals once a change of location of each of the terminals is sensed by a sensor installed in each of the terminals.

The server is further configured to determine a location of each of the terminals by input of a user, by being sensed by a sensor installed in each of the terminals, or by using a signal for distance measurement.

The server is further configured to determine a weighted value used for integrating the speech signals according to distances between the user and the terminals based on speech recognition performance according to the distances between the user and the terminals.

In another general aspect, there is provided a speech recognition method including: connecting terminals through a communication network to a server, calculating times of arrival of a speech sound at each of the terminals using the speech signals received from each of the terminals, calculating distances between a user and the terminals based on the times of arrival of the speech sound to each of the terminals, and recognizing a command to control a target by integrating speech recognition results obtained from the speech signals using a weighted value determined based on the distances.

Other features and aspects will be apparent from the following detailed description, the drawings, and the claims.

Figure 1A:
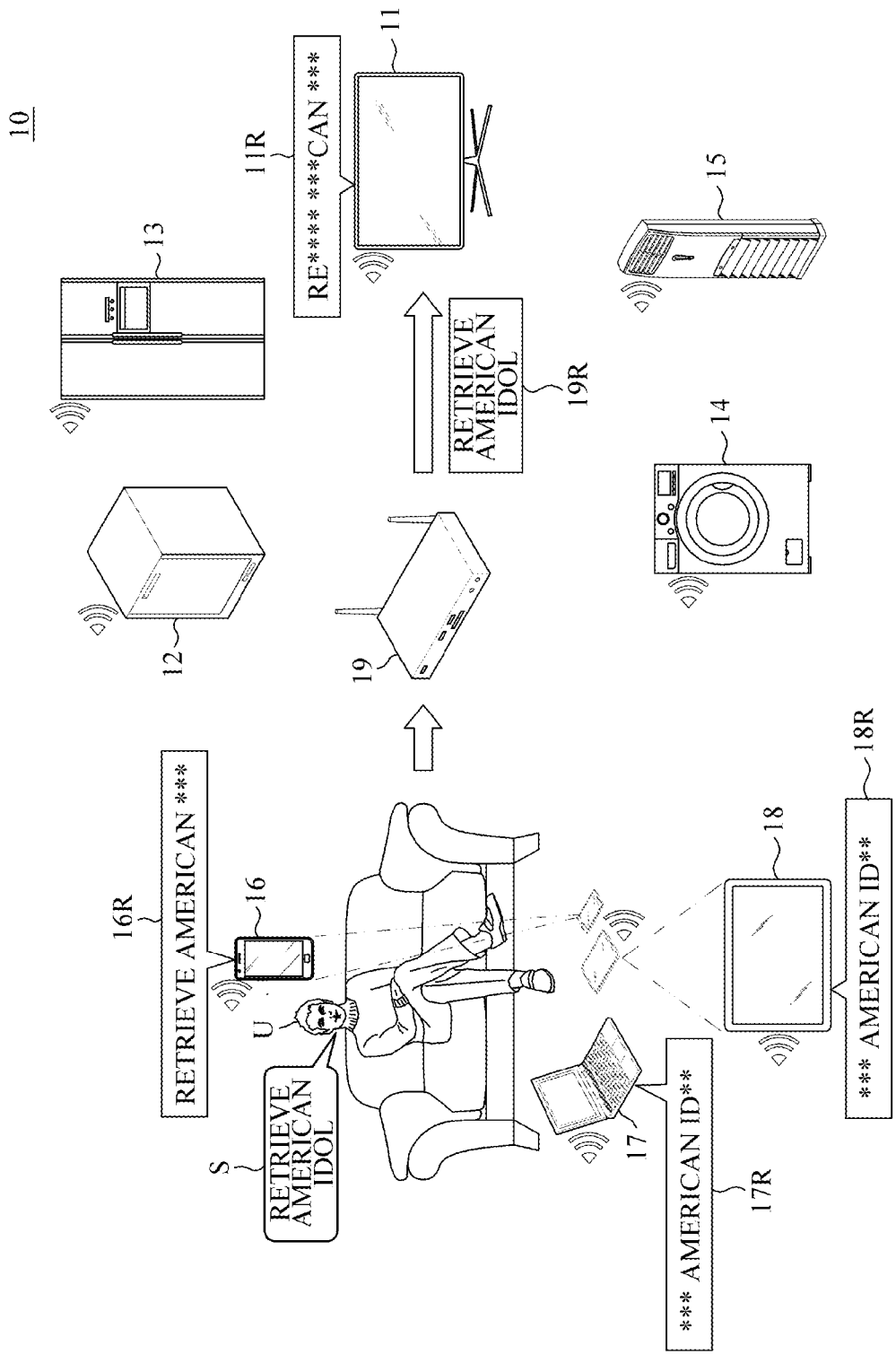
FIG. 1A is a diagram illustrating an example of using a speech recognition system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In a general device control technology through speech, as the distance between a user and a device that receives the user's speech increases, speech recognition accuracy is decreased significantly, thereby preventing a widespread use of a speech controlling method. Accordingly, there is a need for a technology that recognizes a user's speech as a command with accuracy regardless of the distance between a user and a target device to be controlled by the user's speech, and to transmit the recognized speech commands to the target device.

More recently, with the development of electronic technology, various devices, such as home appliances, multimedia devices, information appliances, and the like, which may be installed or provided indoors, may have a speech recognition function. Examples of such devices may include a TV, an air conditioner, a refrigerator, a washing machine, a dish washer, a rice cooker, a game console, a laptop computer, a smartphone, a tablet personal computer (PC), and the like. While sitting on a sofa, a user can easily control through speech a smartphone or a laptop computer that is placed about dozens of centimeters away. However, the user cannot easily control an air conditioner or a TV that is placed about 3 to 4 meters away because current speech recognition technology provides high accuracy of speech recognition only in a case where speech is received dozens of centimeters away from where the speech is made. Thus, speech may not be recognized accurately if a location where the speech is received is few meters away from where the speech is made.

When a user desires to control through speech a target device (hereinafter referred to as a "target" in some cases) that is relatively distant, the distant target device may be controlled through speech by, for example, using a remote speech controller that may be held in a user's hand and placed near a user's mouth. The remote speech controller may receive speech and recognize a command to emit a radio signal, such as ultrasound, infrared, or the like. Such remote speech controller may be implemented in a device to be exclusively used as a remote speech controller, or may be implemented in a conventional device, such as a smartphone, by installing an application programmed to perform the function of remote speech control. Even when using a remote speech controller, in order to control a target device through speech, the remote speech controller may need to be located near a user, and the remote speech controller may need to accurately recognize a user's command given through speech.

Further, in order to control a distant target through speech, a multiple speech recognition method may be suggested, in which at least two or more devices are used, rather than one specific device, to recognize speech. In this method, each of a plurality of devices receives and recognizes a user's speech, and individual speech recognition results are integrated to produce a final speech recognition result. That is, each speech recognition device near a speaker recognizes the speaker's speech as a command, and recognition results obtained from each of the devices are integrated based on distances between the speaker and the speech recognition devices to obtain a final recognition result. Accordingly, there is no need for any one device to recognize full details of a specific speech command given from a user to a specific target.

In this multiple speech recognition method, accuracy of speech recognition results obtained from each of a plurality of speech recognition devices may be largely determined depending on distances between a speaker and each of speech recognition devices. Therefore, by determining a distance between a speaker and each of speech recognition devices, it is possible to determine a weighted value to be applied to each recognition result based on a determined distance. Additionally, by integrating recognition results using the determined weighted value, it is possible to obtain a final speech recognition result with improved accuracy. Accordingly, in order to implement a multiple speech recognition method, there is a need for a technology to determine distances between a user and devices.

Once relatively large devices, such as a refrigerator, a TV, an air conditioner, and the like, are installed, these devices stay in places where they have been installed and are rarely moved. Meanwhile, relatively small mobile devices, such as a laptop computer, a table PC, a game console, a smartphone, and the like, may often be positioned at different locations. Further, a speaker's locations are not always the same at home. Accordingly, determining distances between a speaker and the devices may include detecting distances between a speaker whose location is not fixed and whose speaking times are uncertain, and the devices of which locations may be or may not be fixed.

For example, in order to detect distances between the speaker and the devices, there may be a method of directly measuring such distances by using ultrasonic sensors provided for each of the devices at a time when a speech command is recognized. This method discloses, in theory, that ultrasonic sensors provided for each device may emit ultrasound toward a speaker, and may receive ultrasound reflected from the speaker. Thereafter, the distances between ultrasonic sensors and a speaker may be calculated by using ultrasound speed and measured lapse of time.

In practice, however, devices may not recognize where a speaker is positioned, such that ultrasound needs to be emitted toward all directions based on device locations. In a case where conventional devices, such as a TV or a smartphone, are used as a separate speech recognition device, a range of ultrasound emissions by ultrasonic sensors may be limited. If an emission range of ultrasonic sensors is limited, and a speaker is not within the range, it is impossible to measure a distance between a device and a speaker. As ultrasound has a frequency higher than a general audible frequency, straightness of ultrasound is relatively higher than that of sound. For this reason, there may be an obstacle that hinders ultrasound waves while allowing sound waves. In a case where there is an obstacle between ultrasound sensors and a speaker, ultrasound may not reach the speaker, making it impossible to measure distances therebetween. Further, it may not be assumed that all the objects that reflect ultrasound may be speakers, there is a need for an additional process or an additional device to differentiate a speaker from these objects.

As described above, a method of directly measuring distances between a speaker and each device using ultrasound does not guarantee that distances between a speaker and all the devices that recognize speech may be measured. Speech recognition results obtained from devices, of which distances from a speaker are not be measured, may not be used for an integrated speech recognition, and only the speech recognition results obtained from the devices, of which distances from a speaker are measured may be used for an integrated speech recognition. For this reason, accuracy of speech recognition may not be guaranteed with stability in the method of directly measuring distances. Accordingly, in order to implement a stable multiple speech recognition technology, it is required to accurately measure distances between a speaker and all the devices that recognize a command of the speaker in an at least partially meaningful manner.

The present embodiment provides a speech recognition method that improves recognition accuracy of the recognized commands to control target devices regardless of distances between target devices and a speaker. In the speech recognition method according to an embodiment, speech commands to control target devices may be accurately recognized by calculating distances between terminals and a speaker based on a time when the speaker's speech sound reaches a plurality of speech receiving terminals located near the speaker, and by applying a weighted value based on the calculated distances to integrate speech recognition results of these terminals.

In an embodiment, even if absolute distances between a speaker and the devices may not be identified, speech recognition results may be integrated by applying a weighted value according to relative distances calculated based on a time when speech reaches the devices. Alternatively, if an exact distance between a speaker and devices may be identified, speech recognition results may be integrated with improved accuracy based on a weighted value obtained through experiments conducted in advance. The speech recognition method according to an embodiment is performed based on a network environment where a plurality of terminals, a server, and a target device are connected through a wired or wireless communication network. Each of the terminals may be devices that perform a speech recognition function, or may be connected to the server through a wired or wireless communication network. The server may be a device that receives speech signals through wired or wireless communication network, and integrates the received speech signals to recognize commands to control a target device. The target device (or target) may be a device that receives commands finally recognized by the server, and that is controlled according to the received commands to perform a specific action.

Accordingly, a network environment where the speech recognition method may be performed according to an embodiment may be an environment where a plurality of devices that may be controlled through speech are installed indoors, e.g., in a home kitchen or living room. Such devices that may be controlled through speech may generally receive speech from a user or a speaker, may recognize commands by comparing the received speech signals with pre-stored commands, and may perform an action according to the recognized commands. Further, these devices that may be controlled through speech may include a user interface component that includes a user output device, such as a display, a speaker, a touch screen, and the like, and a user input device, such as a keyboard, a mouse, a keypad, a joystick, a microphone, and the like. Examples of such devices include various types of home appliances, multimedia devices, information appliances, personal portable devices, and the like, including a smart TV, an air conditioner, a refrigerator, a dishwasher, a set-top box, a laptop computer, a desktop computer, a game console, a smartphone, a tablet PC, a router, a server computer, and the like.

In the present disclosure, for convenience, a "terminal" refers to a device that receives speech, a "server" refers to a device that integrates speech, and a "target" refers to a device that is controlled through speech. The terminal, the server, and the target may be implemented as a separate device, each of which performs its own specific function, the terminal and the target may be implemented as one device, and the terminal, the server, and the target may all be implemented in one device, as is well known in the art.

Once a specific terminal is connected in a network environment where the speech recognition method is performed, initialization may be performed first. By the initialization, information on a terminal that has just entered the network, including identification information, location information, and the like, is registered with a server, and the terminal may be time-synchronized with the server. Then, once each terminal receives speech sound from a speaker, a speech receiving process may be performed in which the received speech sound is converted into a speech signal to be transmitted to a server. Subsequently, an integrated recognition process may be performed in the server, in which speech signals obtained from a plurality of terminals are integrated so that the speech signal as a command to control targets may be finally recognized.

By the initialization, a server may identify devices existing in a speech recognition network, and may register information on whether identified devices are terminals or targets, or both. If devices are terminals, the server identifies positions of the terminals, and time-synchronizes them. If devices are targets, the server may identify command information for targets. The command information for targets is a set of commands to control targets, and may be used as a standard to identify a target, for which a command recognized by the server, is provided.

For time synchronization of terminals with a server, various known methods may be used without any limitation. For example, any one of various known time-synchronization methods used in wired or wireless network may be used, such as Network Time Protocol (NTP), IEEE 802.3, IEEE 1588, Reference Broadcast Synchronization (RBS), a Timing-sync Protocol for Sensor Networks, Global Positioning System (GPS), and the like.

Information on locations of terminals is required for a server to calculate distances between terminals and a speaker, and may be transmitted from terminals to a server during initialization after terminals are connected to a network. Alternatively, the information on the locations of the terminals may be transmitted every time the locations of the terminals, which are mobile devices, are changed. Information on locations of terminals may be registered by transmitting the information sensed by, for example, a position sensing component, such as a built-in GPS sensor, or the like, to a server. Alternatively, after terminals are installed, a user may manually measure terminal locations using a tape measure, a protractor, or the like, and may input information on the measured locations into the terminals to store the information therein. Then, the stored location information may be transmitted from the terminals to a server during initialization. Otherwise, locations of the terminals may be calculated by measuring distances between the terminals. That is, during initialization, the terminals transmit or receive speech signals, such as ultrasound, infrared, or the like, to or from other terminals in a network of which locations have already been identified. Additionally, the terminals may calculate distances between the terminals based on the speech signals, in which locations of the terminals may be calculated by a triangulation method.

During initialization of a certain device after the device is connected to a network, if identification information of the device has already been registered, it is sufficient to update location information of the device and to perform time-synchronization. However, if a new device is connected to a network for the first time, identification information of the new device is required to be registered. Identification information of a device includes not only intrinsic information to distinguish devices, but also information on whether a device is a terminal device or a target device, or information on whether a terminal device is provided with a graphic user interface or a user interface using speech.

In a speech receiving process performed in each of a plurality of terminals, speech recognition does not need to be accurate enough to recognize a specific command. In a speech receiving process, it is sufficient to recognize that speech is received in which certain meaningful information may be included. Therefore, each terminal converts received speech sound into speech signals in a form of an electromagnetic wave, and determines whether these speech signals may have meaningful information. If the speech signals are determined to be speech information that may have meaningful information, these speech signals may be transmitted to a server. In an alternative embodiment, it is possible to recognize speech signal as a command with improved accuracy in each terminal, and then to transmit results of the speech recognition to a server.

Integration performed in a server may include: synchronizing each speech sound received from a plurality of terminals; calculating time of arrival of the speech sound at terminals when speech sound reaches each terminal and time difference of arrival; calculating distances between each terminal and a speaker based on the time of arrival; determining a weighted value for speech signals of each terminal using the calculated distances between each terminal and a speaker based on the time of arrival; and integrating speech recognition results obtained from the speech signals by applying the determined weighted value and performing a final speech recognition process to recognize a command.

A server may process speech signals transmitted from a plurality of terminals by a cross correlation method such as a generalized cross correlation (GCC) for a specific frequency band. Speech signals may be synchronized by, for example, obtaining a coefficient of correlation between each speech signal and reference speech signal that is already known, and using a point of a maximum coefficient. Accordingly, time of arrival when a speaker's speech reaches each terminal, or delayed time of arrival may be calculated.

Then, a relative distance between each device and a speaker may be calculated by multiplying the calculated delayed time of arrival by a speed of sound. Further, locations of a speaker may be estimated based on differences in times of arrival when a speaker's speech sound reaches a plurality of terminals. Further, locations of a speaker may be estimated by, for example, using a location estimation method, such as Time of Arrival (TOA), Time Difference of Arrival (TDOA), or the like, and a triangulation method, which are well known in the art. By using the estimated speaker location and a terminal location that is already known, a distance between a speaker and a terminal may be calculated.

Upon calculating a distance between a speaker and a terminal, a weighted value to be applied to speech signals from each terminal may be determined based on the calculated distance. The weighted value may be determined based on speech recognition performance according to distances.

The relation between distances and speech recognition performance may be provided by a server or terminal manufacturer or provider, and may indicate speech recognition performance according to an average or ideal terminal distance. Data that indicates an empirical relation between distances and speech recognition performance may be determined based on information on speech recognition performance of each terminal according to distances obtained through experiments by device manufacturers or providers, or the like. As the empirical relation between distances and speech recognition performance is determined through experiments, a process of linear interpolation or a spherical linear interpolation may be further required when determining a weighted value in a server.

Data that indicates such relation between distances and speech recognition performance may be stored in terminals by manufacturers or providers, and may be transmitted to a server when terminals are connected to a network to be initialized, so that the data may be stored as part of terminal information to be used when determining a weighted value.

As described above, in an embodiment, distances between a speaker and terminals may be calculated by using time of arrival when a speaker's speech reaches each terminal, such that distances between a speaker and "all" the terminals that receive the speaker's speech may be calculated. Therefore, speech signals obtained from all the terminals that receive speech may be used for speech recognition in a server.

Further, in an embodiment, speech recognized in a server may be compared to target information stored in advance to be used to determine a target device that is intended to be controlled through the command to perform a specific action, and upon comparison, the target information may be transmitted to a target device. Accordingly, recognition accuracy of a speaker's speech may be guaranteed regardless of distances between a target device and a speaker, thereby enabling operations of a remote target device to be controlled through a speaker's speech.

Further, in an embodiment, in a case where a speech command recognized in a server may be applied to two or more target devices, a speaker may select one of the two or more target devices. For example, when terminals are connected to a server to be initialized, information on whether each terminal is of a type that may provide a user interface may be registered with a server as part of terminal identification information. A server may select, as an interface terminal, a terminal that is nearest to a speaker from among terminals that may provide a visual or acoustic user interface. Then, a request to select a target device, such as "Please select one among a plurality of recognized target devices," may be output to a user from a selected interface terminal. A user may select a desired target device by touching select items displayed on a touch screen, or by speaking a select command. The user's selection is transmitted from an interface terminal to a server, and the server may transmit a command to a target device selected by a user. Accordingly, a desired target device may be accurately selected to be controlled through a speaker's speech regardless of a distance between a target device and a speaker.

An example of a speech recognition system and method will be described below with reference to the following drawings.

Hereinafter, embodiments of a speech recognition system will be described with reference to FIGS. 1 to 12. These embodiments are merely illustrative, and one of ordinary skill in the art would easily understand that other systems in various combinations may also be provided within the scope of the following claims. Components of the speech recognition system may be implemented by hardware that includes circuits for each function of these components. Further, components of the speech recognition system may be implemented by a combination of computer-executable software, firmware, and hardware, which enable the components to perform specific tasks when executed by a processor of a computing device.

FIG. 1A is a diagram illustrating an example of using a speech recognition system.

FIG. 1A illustrates a speech recognition system 10 including various devices that may receive various types of speech and may be controlled at home, such as a smart TV 11, a dishwasher 12, a refrigerator 13, a washing machine 14, an air conditioner 15, a smartphone 16, a laptop computer 17, a tablet PC 18, and a set-top box 19$_{[DXR1]}$.

The above devices, except the set-top box 19, may receive speech, and the set-top box 19 may receive speech signals from each device to integrate the signals. Further, at least some of the devices, e.g., the smart TV 11, the dishwasher 12, the refrigerator 13, the washing machine 14, the air conditioner 15, or the like, may perform specific actions according to predetermined commands. In the embodiment, while lying on a sofa and watching a movie played on the smart TV 11, a user (U) makes a speech input of command to retrieve a TV program titled "American Idol" to the TV 11, so that a function of retrieving programs of the smart TV 11 may be executed.

Such user's speech (S) may be received by at least some of speech receiving devices located near the user as a speech signal that has meaningful information. The dishwasher 12, the refrigerator 13, the washing machine 14, the air conditioner 15, or the like, may not receive speech that has meaningful information, as these devices are placed too far from the user. By contrast, the smartphone 16, the laptop computer 17, the tablet PC 18, and the TV 11, or the like may receive speech signals 11R, 16R, 17R, and 18R that have meaningful information of various levels, although speech recognition accuracy of these devices varies depending on their distances from the user. Although a user wishes to control the TV 11 through speech, the TV 11 may fail to recognize a user's command accurately because the TV 11 is placed too far from the user. Further, other devices, although having received speech, may also fail to recognize a user's command accurately.

The speech signals 11R, 16R, 17R, and 18R received by these various devices are transmitted to the set-top box 19. The set-top box 19 may integrate the speech signals 11R, 16R, 17R, and 18R to accurately recognize a command 19R intended by the user's speech (5). Accordingly, the command 19R recognized by the set-top box 19 may be transmitted from the set-top box 19 to the TV 11, thereby enabling the user (U) to control the TV 11 through speech without approaching the TV 11.

Figure 1B:
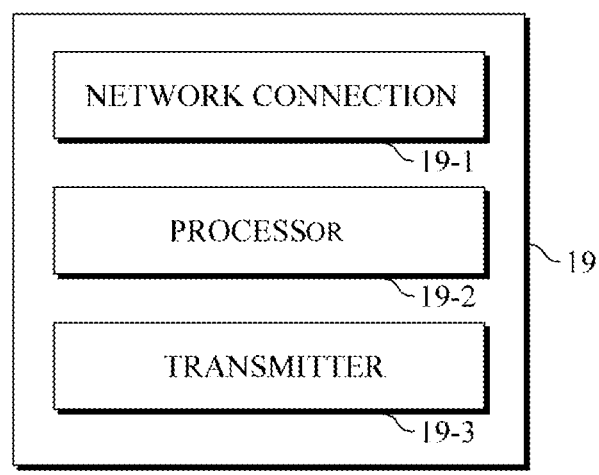
FIG. 1B is a diagram illustrating an example of a server in a speech recognition system.

FIG. 1B is a diagram illustrating an example of a server in a speech recognition system.

Referring to FIG. 1B, the server 19 includes a network connector 19-1, a processor 19-2 and a transmitter 19-3. The network connector 19-1 may connect to terminals 21 through a communication network. The processor 19-2 may calculate times of arrival of a speech sound at each of the terminals 21 using speech signals. The speech signals may be received from each of the terminals 16, 17 and 18. The processor 19-2, may further calculate distances between a user and the terminals based on the times of arrival of the speech sound to each of the terminals. Finally, the processor 19-2 may recognize a command to control a target by integrating speech recognition results obtained from the speech signals using a weighted value determined based on the distances. The transmitter 19-3 may transmit the command to control the target.

Figure 2:
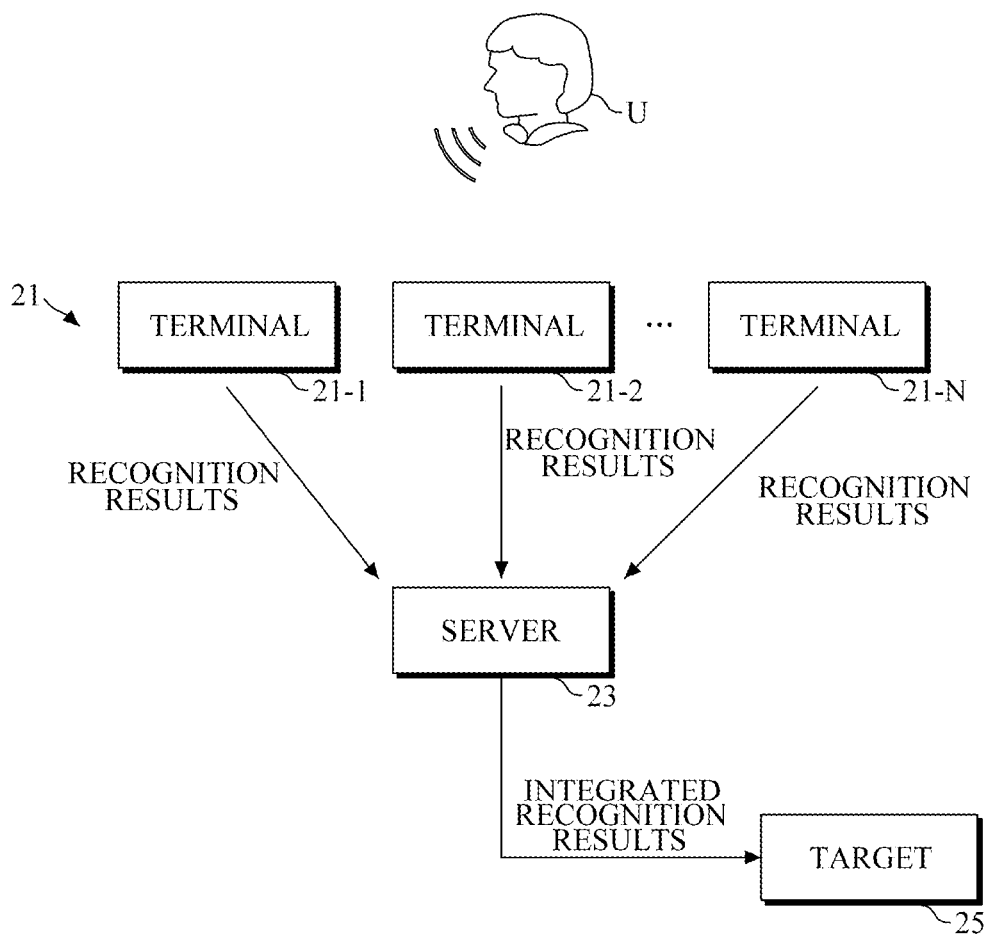
FIG. 2 is a block diagram illustrating an example of a speech recognition system.

FIG. 2 is a block diagram illustrating an example of a speech recognition system.

FIG. 2 illustrates a speech recognition system 20 representing the speech recognition system 10 of FIG. 1A as a separate functional block.

The speech recognition system 20 includes a plurality of terminals 21, 21-1, 21-2, . . . , and 21-N to receive speech, and a server 23 to recognize speech. Speech recognized by the server 23 is transmitted to a target 25, so that the target 25 may be controlled by speech. The terminals, the server, the target, or the like, are illustrated as separate functional blocks, but in practice, all of these components may be provided in one physical device, as is well known in the art. By contrast, rather than being implemented in one device, the plurality of terminals may be implemented in a plurality of devices that are separately placed.

The speaker (U) may give a speech sound to control the target 25. While being spread as physical waves in a space, the speech sound is received by the plurality of terminals 21, 21-1, 21-2 . . . , and 21-N that are positioned at separate locations. Each of the terminals converts the received speech sound into electronic speech signals, and the converted speech signals may be transmitted to the server 23 through a wired or wireless communication network that transmits and receives electronic signals. The electronic signals generated in the terminals may include not only electronic signals converted from physical speech, but also signals recognized as a speech signal that is likely to include a meaningful command, as well as the speech signals recognized with improved accuracy as a command that is likely to include a specific pre-stored command, and the like.

The server 23 may recognize a command by integrating these speech recognition results obtained from the speech signals. The server 23 may recognize a command by applying a weighted value according to distances between the speaker (U) and each of the terminals that have been calculated based on times of arrival when speech reaches each of the terminals from the speaker (U), and by integrating speech recognition results of these terminals. The recognized speech may be transmitted from the server 23 to the target 25 through a wired or wireless communication network.

As described above, in the speech recognition system 20, speech made by the speaker (U) is not directly received and recognized by the target 25. Instead, the speech is received by the plurality of terminals 21 that are positioned at separate locations near the speaker and the target, to be integrated by the server 23 based on times of arrival when the speech reaches the terminals and recognized, and then transmitted to the target 25. In this method, there is no need for the speaker's speech to be transmitted as physical sound waves through the entire distance between the speaker (U) and the target 25. For example, the speech of the speaker (U) is transmitted as physical sound waves only between the speaker (U) and the plurality of terminals 21, and then the speech is transmitted as electronic signals from the plurality of terminals 21 via the server 23 to the target 25 as a destination through a wired or wireless electronic communication network.

In an environment where the plurality of terminals 21 that may receive speech are positioned near the speaker (U) all the time, the speech recognition system 20 may enable the target 25, which is distant from the speaker (U), to be controlled through speech regardless of the types of the terminals 21. As described above with reference to FIG. 1A, the environment can be readily created in a case where a plurality of devices, which may be controlled through speech, are installed separately from each other in indoor spaces, such as a living room, or a bedroom.

Figure 3:
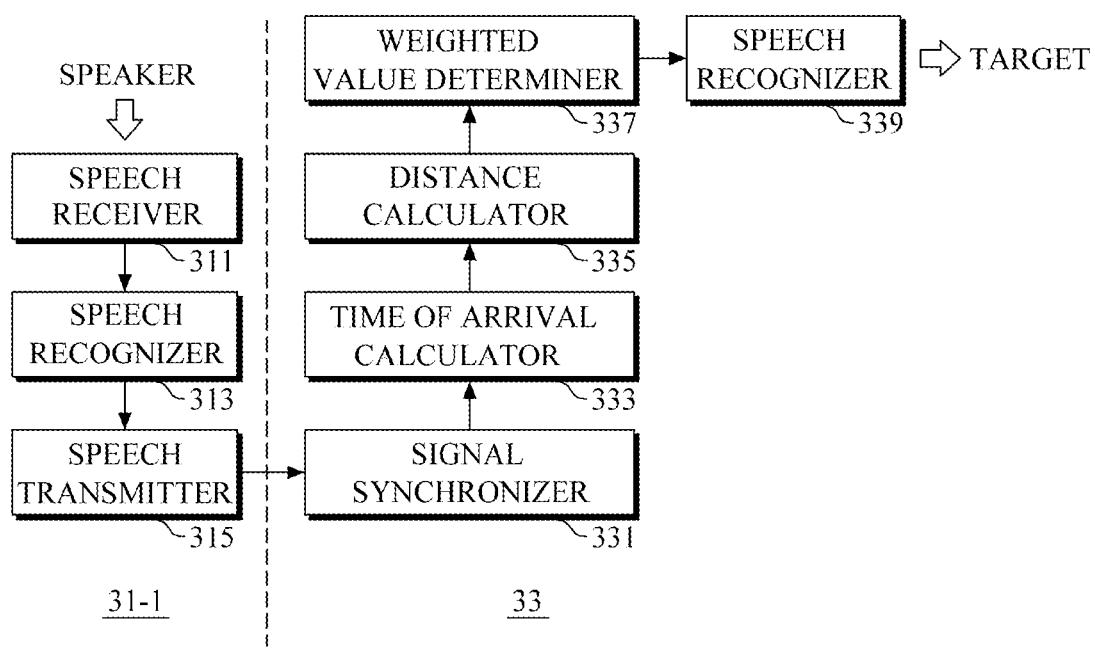
FIG. 3 is a block diagram illustrating another example of a speech recognition system.

FIG. 3 is a block diagram illustrating another example of a speech recognition system.

Referring to FIG. 3, one terminal 31-1 of the plurality of terminals in the speech recognition system of FIG. 2 and a server 33 are illustrated.

The terminal 31-1 is a device that receives speech from a speaker and transmits the received speech to the server 33. The terminal 31-1 may include components, such as a speech receiver 311, a speech recognizer 313, a speech transmitter 315, and the like.

The speech receiver 311 receives speech transmitted as physical sound waves in a space, and converts the received speech into electronic speech signals. The speech receiver 311 may include a microphone to convert physical pressure into electronic signals.

The speech recognizer 313 recognizes whether speech signals generated by the speech receiver 311 have meaningful information or not. When the speech recognizer 313 recognizes speech, there is no need to recognize whether speech signals include a speech command to control a specific target. It is sufficient for the speech recognizer 313 to only recognize that at least some speech sounds are human voices that are likely to indicate some words or syllables.

The speech transmitter 315 converts speech sound into speech signals, which have been recognized by the speech recognizer 313 to include meaningful information, into electronic communication speech signals, and transmits the converted signals to the server 33 through a wired or wireless communication network.

Although only one terminal 31-1 is illustrated in FIG. 3, other similarly configured terminals may also receive speech sound almost at the same time from an identical speaker, and then may transmit speech signals to the server 33. A plurality of terminals may be positioned at different locations, and may be different distances apart from a speaker. Accordingly, times when a speaker's speech is received by each of the terminals, i.e., times of arrival when speech sound reaches each of the terminals, may be different. For example, sound waves, which have a velocity of about 340 m/s in air, may proceed at about 34 cm per 1 m/s. Therefore, assuming that there are terminals in an indoor space of 6 m to 7 m in width, there may be delays of arrival time of about 0.1 mgs to 20 m/s depending on distances between terminals and a speaker.

The server 33 recognizes a command by integrating speech signals transmitted from a plurality of terminals based on times of arrival when speech sound reaches each of the plurality of terminals. The server 33 may include components, such as signal synchronizer 331, a time of arrival calculator 333, a distance calculator 335, a weighted value determiner 337, and a speech recognizer 339.

The signal synchronizer 331 synchronizes speech signals transmitted from a plurality of terminals. For example, speech signals may be synchronized with pre-defined reference signals using a correlation coefficient obtained by a Generalized Cross Correlation (GCC) method for a specific frequency band.

The time of arrival calculator 333 calculates time of arrival of the speech sound at the terminals when speech sound reaches each of the terminals based on synchronized speech signals. For example, by detecting specific points in time from synchronized speech signals, it is possible to calculate differences in times of arrival when speech sound reaches each of the terminals.

The distance calculator 335 calculates distances between a speaker and each of the terminals based on times of arrival when speech reaches the terminals. For example, distances between a speaker and each of the terminals may be calculated by using a method of detecting a signal source based on differences in arrival times of signals between a signal source and a receiving device, such as a time difference of arrival (TDOA) method and the like, and by using a triangulation method.

The weighted value determiner 337 determines a weighted value to be applied to speech signals of terminals according to distances between a speaker and terminals. The weighted value may be determined based on speech recognition performance according to distances. Data associated with speech recognition performance according to distances may be determined based on data associated with reference terminals. Alternatively, data associated with speech recognition performance according to distances may be determined based on speech recognition performance data according to distances, the data being obtained through experiments for each terminal.

Unlike the speech recognizer 313 of the terminal 33-1, the speech recognizer 339 of the server 33 recognizes speech as a command for a specific target. The speech recognizer 339 may generate an integrated speech signal by applying a weighted value determined by the weighted value determiner 337 to speech signals transmitted from a plurality of terminals, and by integrating the speech signals. Subsequently, the speech recognizer 339 processes the integrated speech signal to identify words or syllables. Further, the speech recognizer 339 may determine whether the identified words, syllables, or the like, are commands to control a specific target or not. The speech recognizer 339 may refer to various types of information, such as a database for identifying Korean words, syllables, or the like, a database for identifying English words, syllables, or the like, command information for control of TV sets, command information for control of an air-conditioner, and the like. These types of information may be stored in advance in the server 33 to be provided to the speech recognizer 339.

If speech recognized based on an integrated speech signal obtained by integrating speech signals transmitted from a plurality of terminals is recognized by the speech recognizer 339 as a speech command for a specific target, the speech may be transmitted to the target as an electronic signal.

Figure 4:
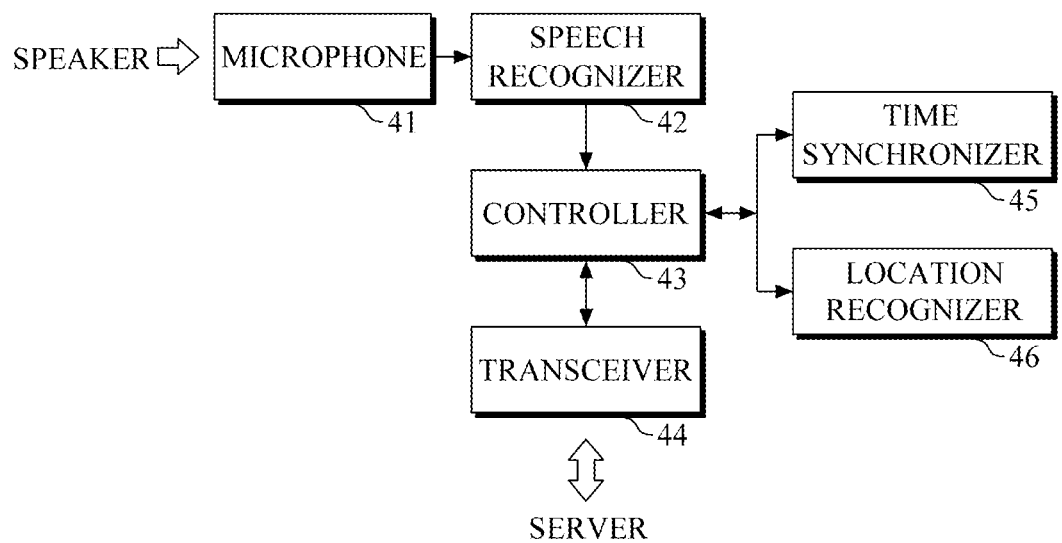
FIG. 4 is a diagram illustrating an example of a terminal in a speech recognition system.
Figure 5:
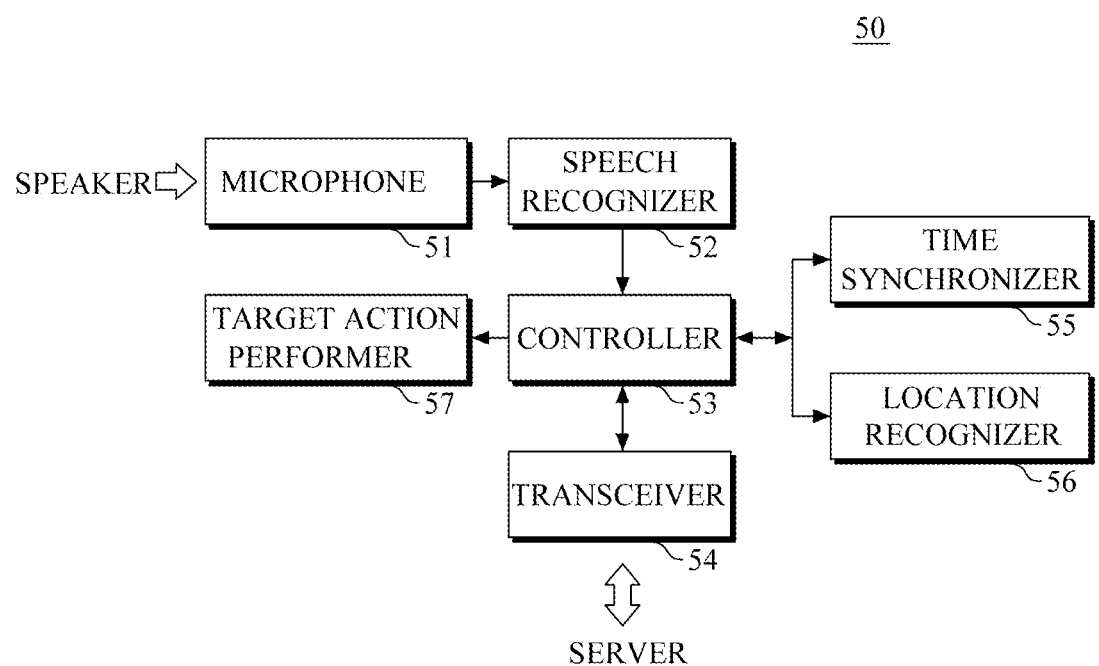
FIG. 5 is a block diagram illustrating an example of a device, which acts as a terminal and a target, in a speech recognition system.
Figure 6:
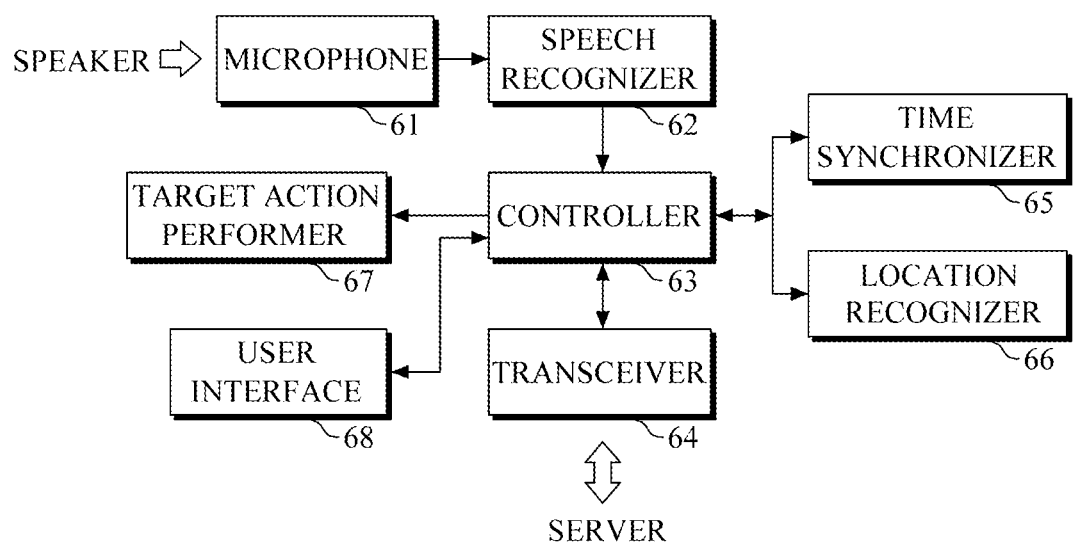
FIG. 6 is a block diagram illustrating another example of a device, which acts as a terminal and a target, in a speech recognition system.

FIGS. 4 to 6 illustrate various examples of a terminal of a speech recognition system.

Specifically, FIG. 4 is a diagram illustrating an example of a terminal in a speech recognition system. FIG. 5 is a block diagram illustrating an example of a device, which acts as a terminal and a target, in a speech recognition system. FIG. 6 is a block diagram illustrating another example of a device, which acts as a terminal and a target, in a speech recognition system.

FIG. 4 is a diagram illustrating an example of a terminal in a speech recognition system.

Referring to FIG. 4, an example of a terminal 40 is illustrated that receives speech sound from a speaker and transmits converted speech signals to a server. The terminal 40 may include components, such as a microphone 41, a speech recognizer 42, a controller 43, a transceiver 44, a time synchronizer 45, and a location recognizer 46. Although FIG. 4 illustrates the microphone 41, the speech recognizer 42, the controller 43, the transceiver 44, the time synchronizer 45, and the location recognizer 46 as being included in the terminal 40, these components may be embodied as independent hardware.

The microphone 41, which corresponds to the speech receiver 311 in FIG. 3, receives speech sound from a speaker and converts the received speech sound into an electronic speech signal. The speech recognizer 42, which corresponds to the speech recognizer 313 in FIG. 3, may recognize whether the electronic signal generated by the microphone 41 includes meaningful information. The controller 43 converts the received speech sound into speech signals and controls each of the components. The transceiver 44 transmits and receives electronic speech signals to and from a server through a wired or a wireless communication network.

When the terminal 40 is connected to a server, the time synchronizer 45 executes time-synchronization with a server disposed in a network as one entity of a plurality of terminals with a server at its center when the terminal is connected to the server. The time synchronizer 45 synchronizes the terminal 40 with a server and other terminals existing in a network so that the terminal may indicate the same time at the same moment as the server and other terminals. To this end, the time synchronizer 45 may synchronize time of the terminal 40 with time of the server when the terminal 40 is connected to the server.

The location recognizer 46 registers location information on the server. The location recognizer 46 identifies a location of the terminal 40 in relation to a server and other terminals existing in a network, and registers the identified location of the terminal 40 with the server. As will be described in further detail below with reference to FIG. 7, the location recognizer 46 may identify a location of the terminal 40 by a user's input, by using an embedded sensor, or by transmitting or receiving signals to or from other terminals.

The terminal 40 may be time-synchronized with a server, and may be connected to the server through a communication network as a speech receiving terminal device that may notify a location to the server.

FIG. 5 is a block diagram illustrating an example of a device, which acts as a terminal and a target, in a speech recognition system.

Referring to FIG. 5, an example of a device 50 is illustrated, which is a terminal that receives speech sound from a speaker and transmits converted speech signal to a server, and at the same time, a target to be controlled to perform a specific action through a recognized command. The device 50 may include components for terminal functions, such as a microphone 51, a speech recognizer 52, a controller 53, a transceiver 54, a time synchronizer 55, and a location recognizer 56, as well as components for target functions, such as a target action performer 57. Although FIG. 5 illustrates all of the above components as being part of the device 50, it is noted that the microphone 51, the speech recognizer 52, the controller 53, the transceiver 54, the time synchronizer 55, the location recognizer 56 and the target action performer 57 may be embodied as independent hardware.

The components for terminal functions, such as the microphone 51, the speech recognizer 52, the controller 53, the transceiver 54, the time synchronizer 55, and the location recognizer 56, perform the same functions as the components described above with reference to FIG. 4. Accordingly, the device 50 may be time-synchronized with a server, and may be connected to the server through a communication network as a speech receiving terminal device that may notify a location to the server.

Further, the device 50 may receive a command from the server through the transceiver 54 to control a specific target. Upon receiving a command, the controller 53 transmits the command to the target action performer 57 so that a specific action may be performed. When the device 50 is, for example, an air conditioner or a TV, the target action performer 57 may perform a specific action, such as adjusting indoor temperature or retrieving a specific soap opera.

FIG. 6 is a block diagram illustrating another example of a device, which acts as a terminal and a target, in a speech recognition system.

Referring to FIG. 6, an example of the device 60 is illustrated, which is a terminal that receives speech sound from a speaker and transmits converted speech signal to a server, and to a target. The target is to be controlled through a recognized command to perform a specific action, and is capable of providing a user interface to interact with a user.

The device 60 may include components for terminal functions, such as a microphone 61, a speech recognizer 62, a controller 63, a transceiver 64, a time synchronizer 65, a location recognizer 66, and components for target functions, such as a target action performer 67 and the like, as well as a user interface 68 to interact with a user. Although FIG. 6 illustrates all of the above components as being part of the device 60, it is noted that the microphone 61, the speech recognizer 62, the controller 63, the transceiver 64, the time synchronizer 65, the location recognizer 66, the target action performer 67 and the user interface 68 may be embodied as independent hardware.

The components, such as the microphone 61, the speech recognizer 62, the controller 63, the transceiver 64, the time synchronizer 65, and the location recognizer 66, perform the same functions as the components described above with reference to FIG. 4. Accordingly, the device 60 may be time-synchronized with a server, and may be connected to the server through a communication network as a speech receiving terminal device that may notify a location to the server.

Further, the device 60 may receive, from the server through the transceiver 64, a speech signal that is recognized as a command to control a specific target. Upon receiving such speech as a command, the controller 63 transmits the command to the target action performer 67 so that a specific action may be performed.

Further, the device 60 further includes the user interface 68. The user interface 68 enables the device 60 to interact with a user. As the user interface 68, a graphic user interface, which is provided by, for example, a touch screen environment of a smartphone or a tablet PC, or a display and keyboard environment of a laptop computer, may be used to enable a user to interact with the device 60. Alternatively, the user may interact with the device 60 through speech from a speaker or a microphone. The device 60 may be used as an interface terminal for interaction of a server with a user.

Figure 7:
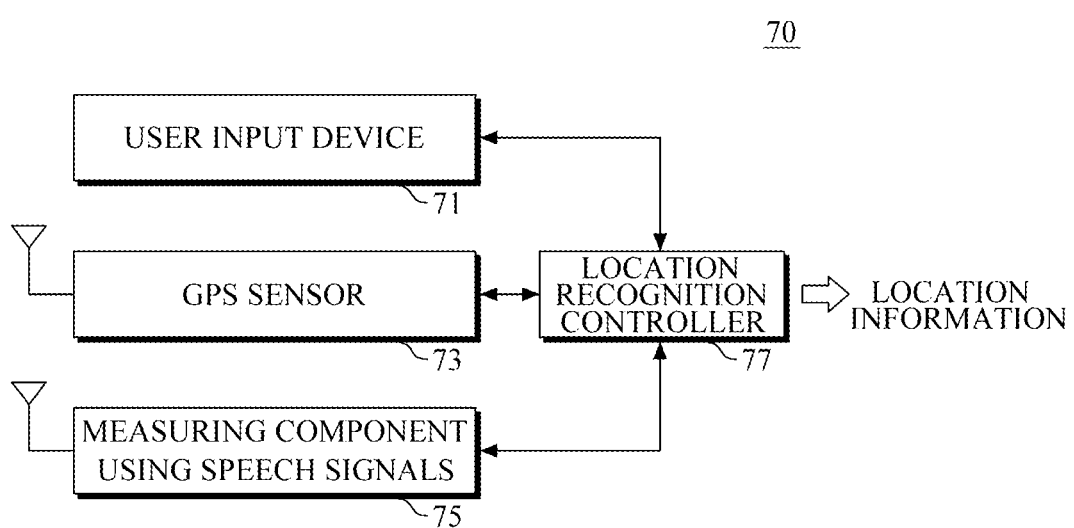
FIG. 7 is a block diagram illustrating an example of a location recognizer of a terminal in a speech recognition system.

FIG. 7 is a block diagram illustrating an example of a location recognizer of a terminal in a speech recognition system.

Referring to FIG. 7, a location recognizer 70 is illustrated that is used to identify terminal locations described above with reference to FIGS. 4 to 6. The location recognizer 70 may include components, such as a user input device 71, a GPS sensor 73, a measuring component 75 using speech signals, and a location recognition controller 77. Although FIG. 7 illustrates the user input device 71, the GPS sensor 73, the measuring component 75, and the location recognition controller 77 as being included in the location recognizer 70, the location recognizer 70 may include more or less of these components. In addition, the components illustrated in FIG. 7 may also be embodied as independent hardware.

The user input device 71 enables a user to input information on terminal locations. Examples thereof include a keyboard, a mouse, a keypad, a virtual keypad, a touch-sensing input device, a trackball, a joystick, a microphone, or the like. For example, after an air conditioner is installed, a user may measure the position of the air conditioner by distance, and angle, and may input the measurement information through the user input device 71 provided for the air conditioner.

The GPS sensor 73 may sense location information of terminals by receiving coordinates, such as, for example, longitude, latitude, and altitude, from a global positioning system (GPS) satellite.

Once terminals are connected to a server, the measuring component 75 using speech signals may calculate distances between the terminals by transmitting and receiving speech signals to and from other terminals connected to the server, and may calculate locations of the terminals by using the calculated distances between the terminals.

Location information of the terminals identified by the user input device 71, the GPS sensor 73, and the measuring component 75 using speech signals, may be output through the location recognition controller 77 to be transmitted to a server.

Although FIG. 7 illustrates a configuration of the location recognizer 70 that includes the user input device 71, the GPS sensor 73, and the measuring component 75 using speech signals all together, it would be evident that a location recognizer according to an exemplary embodiment may include at least one among the user input device 71, the GPS sensor 73, and the measuring component 75 using speech signals.

Figure 8:
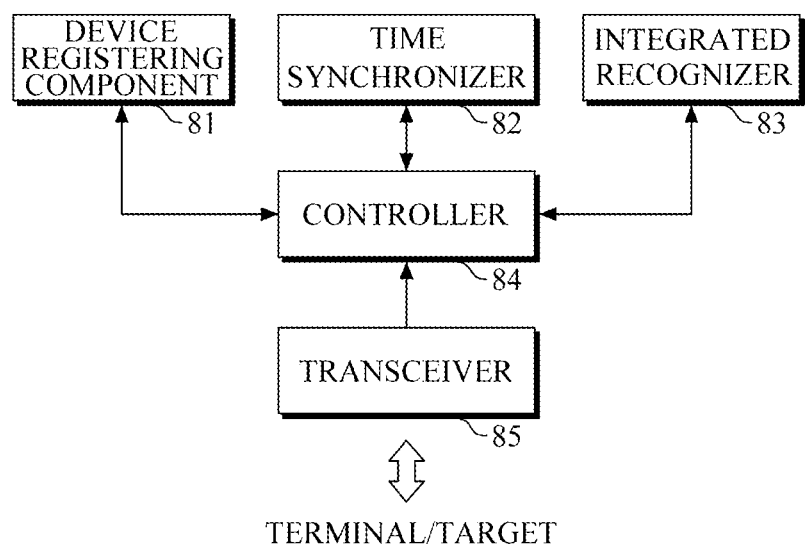
FIG. 8 is a block diagram illustrating an example of a server in a speech recognition system.

FIG. 8 is a block diagram illustrating an example of a server in a speech recognition system.

Referring to FIG. 8, illustrated is a server 80 that integrates and recognizes speech signals transmitted from a plurality of terminals. Once a device is connected to the server 80, the server 80 registers the device as a terminal or a target, performs time synchronization of the device, and transmitted speech signals from a plurality of terminals to integrate the transmitted speech signals, so that a speech signal may be recognized as a command to control a specific target. The server 80 may include components, such as a device registering component 81, a time synchronizer 82, an integrated recognizer 83, a controller 84, and a transceiver 85. However, it is noted that the server 80 may include more or less components than those illustrated in FIG. 8 and thus is not limited thereto.

Once a device is connected to the server 80, the device registering component 81 registers basic information for identifying and initializing the connected device. The device registering component 81 may receive, from a device connected to the server 80, information on whether the device is either a terminal or a target, or both, or information on whether the device is of a type that includes a user interface and the like, and may store the received information. If the device is a terminal, information on a location of the terminal may be further received and stored. If the device is a target, information on speech commands predetermined for target control may be further received and stored. The device registering component 81 will be described later in further detail with reference to FIG. 9.

If a device connected to the server 80 is a terminal, the time synchronizer 82 performs synchronization so that the terminal may be synchronized with time of the server 80.

Based on time of arrival when speech reaches each terminal from a speaker, the integrated recognizer 83 integrates speech signals transmitted from a plurality of terminals to recognize the integrated signals as a specific command for a specific target. For example, the integrated recognizer 83 may synchronize speech signals transmitted from a plurality of terminals, and then may calculate time of arrival when the speech reaches each of the terminals.

Then, distances between a speaker and each of the terminals may be calculated based on the time of arrival of the speech sound at the terminal when the speech reaches the terminals. Further, based on the calculated distances between a speaker and each of the terminals, a weighted value to be applied to speech signals from the terminals may be determined. By applying the determined weighted value to speech signals received from a plurality of terminals and by integrating the signals, the speech may be recognized as a specific command to control a specific target.

According to an embodiment, the integrated recognizer 83 may be configured to include the signal synchronizer 331, the time of arrival calculator 333, the distance calculator 335, the weighted value determiner 337, the speech recognizer 339 and the like described above with reference to FIG. 3. Another example of the integrated recognizer 83 will be described later in further detail with reference to FIG. 11.

The controller 84 may control each component for registering targets, terminals, or the like, for time synchronization, for integrated recognition, or the like. The transceiver 85 transmits and receives data in the form of electronic signals among the server 80, a target, and a terminal.

Figure 9:
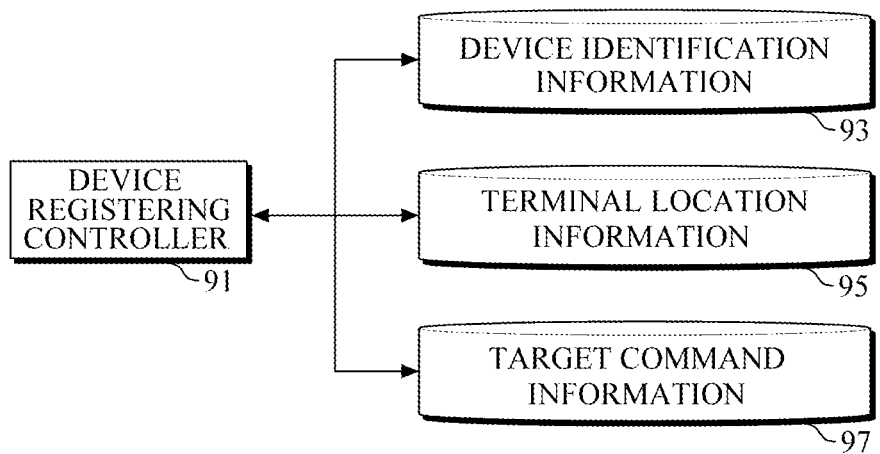
FIG. 9 is a block diagram illustrating an example of a device registering component of a server in a speech recognition system.

FIG. 9 is a block diagram illustrating an example of a device registering component of a server in a speech recognition system.

Referring to FIG. 9, illustrated is an example of a device registering component 90 that may be the device registering component 81 in FIG. 8. The device registering component 90 may include components, such as a device registering controller 91, device identification information 93, terminal location information 95, and target command information 97. However, it is noted that the device registering component 90 may include more or less components than those illustrated in FIG. 9 and thus is not limited thereto.

Once a device is connected to a server, the device registering controller 91 controls registration of basic information for identifying and initializing the connected device. Once a device is connected to a server and transmits identification information of the device, the device registering controller 91 may check the device identification information 93 to determine whether the device is a new device or a registered device. If the device is a new device, the device registering controller 91 may receive identification information from the device and may further store the received information in the device identification information 93.

Device identification information stored in the device identification information 93 may include intrinsic information to distinguish each device. Further, the device identification information may include information on types of devices that indicates whether a device is a terminal or a target. Moreover, the device identification information may include information that indicates whether a terminal includes a user interface or not. In addition, the device identification information may also include whether a terminal is a fixed device, or a mobile device of which locations may be changed frequently.

If a device is a terminal, location information of a current terminal may be additionally received and stored in the terminal location information 95 regardless of whether the terminal is to be newly registered or is already registered. In addition, if a terminal is a mobile device, such as a smartphone, a tablet PC, a laptop computer, or the like, a terminal location is regularly monitored, so that when locations change, location information before a change stored in the terminal location information 95 may be updated to location information after the change. The terminal location information may be used to determine distances between a speaker and terminals while a server is performing speech recognition.

If a device is a target, information on speech commands predetermined for target control may be further received and stored in the target command information 97. The target command information may be used to recognize speech as a command to control a specific target while a server is performing speech recognition.

Figure 10:
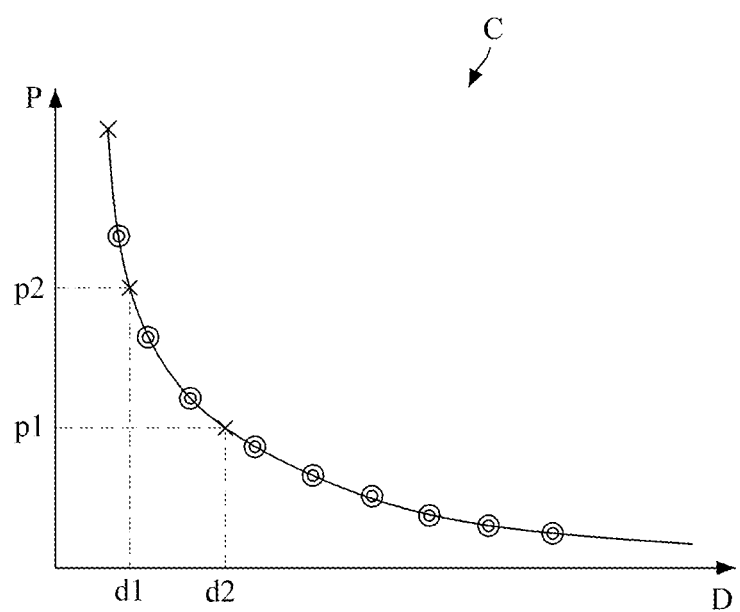
FIG. 10 is a graph schematically illustrating a correlation between speech recognition performance and distance in a speech recognition system.

FIG. 10 is a graph schematically illustrating a correlation between speech recognition performance and distance in a speech recognition system.

Referring to FIG. 10, illustrated is a curve (C) that represents a relation between speaker-terminal distances (D) and performance (P) indicative of speech recognition accuracy, in which speech recognition accuracy reduces significantly according to the distances between a speaker and terminals. The relation curve (C) between distances (D) and speech recognition performance (P) may be determined theoretically, and may be stored in a server. Alternatively, the relation curve (C) between distances (D) and speech recognition performance (P) may be established based on data obtained empirically through experiments.

If the relation between distances (D) and speech recognition performance (P) is based on empirical data, distances d1 and d2 between a speaker and terminals identified by a server may have values not included in the data. In this case, a weighted value may be determined by using performance values p1 and p2 estimated by an interpolation method or an extrapolation method.

Figure 11:
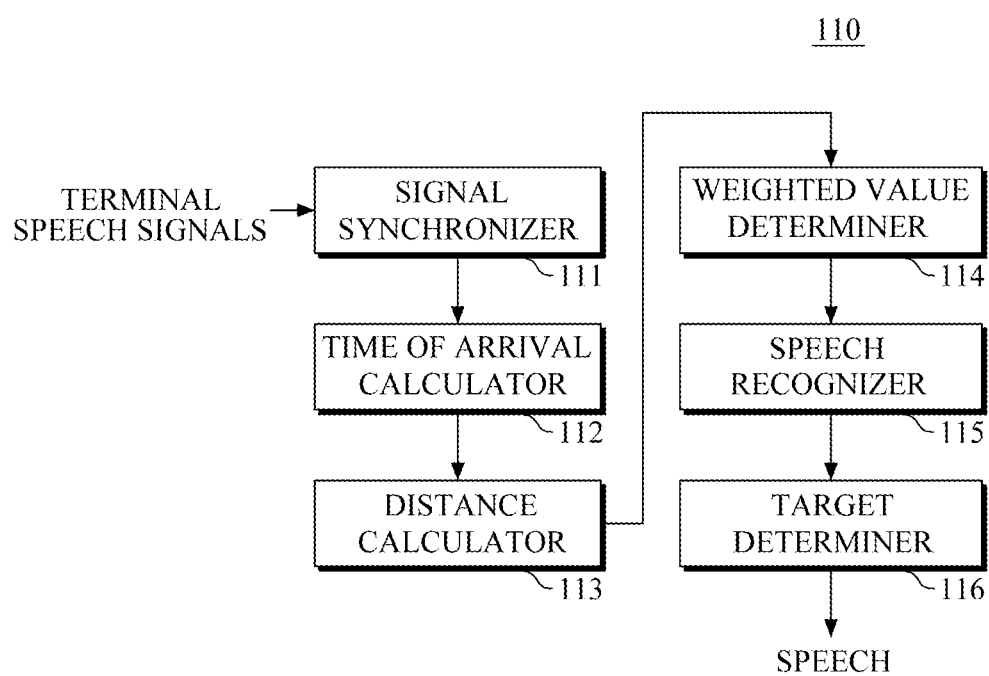
FIG. 11 is a block diagram illustrating an integrated recognizer of a server in a speech recognition system.

FIG. 11 is a block diagram illustrating an integrated recognizer of a server in a speech recognition system.

Referring to FIG. 11, an example of an integrated recognizer 110 is illustrated, which recognizes a speech signal as a command for a target in a server, and if a plurality of targets are recognized, selects one among the targets to transmit a command to the selected target.

The integrated recognizer 110 may include components, such as a signal synchronizer 111, a time of arrival calculator 112, a distance calculator 113, a weighted value determiner 114, a speech recognizer 115, and a target determiner 116. However, it is noted that the integrated recognizer 110 may include more or less components than those illustrated in FIG. 11 and thus is not limited thereto.

The signal synchronizer 111, the time of arrival calculator 112, the distance calculator 113, the weighted value determiner 114, and the speech recognizer 115 may similarly correspond to the signal synchronizer 331, the time of arrival calculator 333 the distance calculator 335, the weighted value determiner 337, and the speech recognizer 339 illustrated above with reference to FIG. 3.

The target determiner 116 may determine the number of targets. If there is a single target, the target determiner 116 transmits the command to the single target. If there are a plurality of targets, the target determiner 116 selects a terminal to provide the user interface to display information related to the plurality of targets and to enable the user to select a desired target, and transmits the command to the selected target according to the user's selection through the interface of the selected terminal.

For example, a speaker may not intend to transmit a command to all of the terminals, because in most cases, the speaker intends to make a speech input to control one target. Therefore, the target determiner 116 selects one target from among a plurality of targets, and transmits a command to the selected target.

A user may select one target from among a plurality of targets. In other words, the target determiner 116 may request a user's selection through a terminal that includes a user interface located closest to the user. Then, once a user inputs a command to select a desired target, the command recognized by a server may be transmitted to a determined target. The process will be described later in further detail with reference to FIG. 12.

Figure 12:
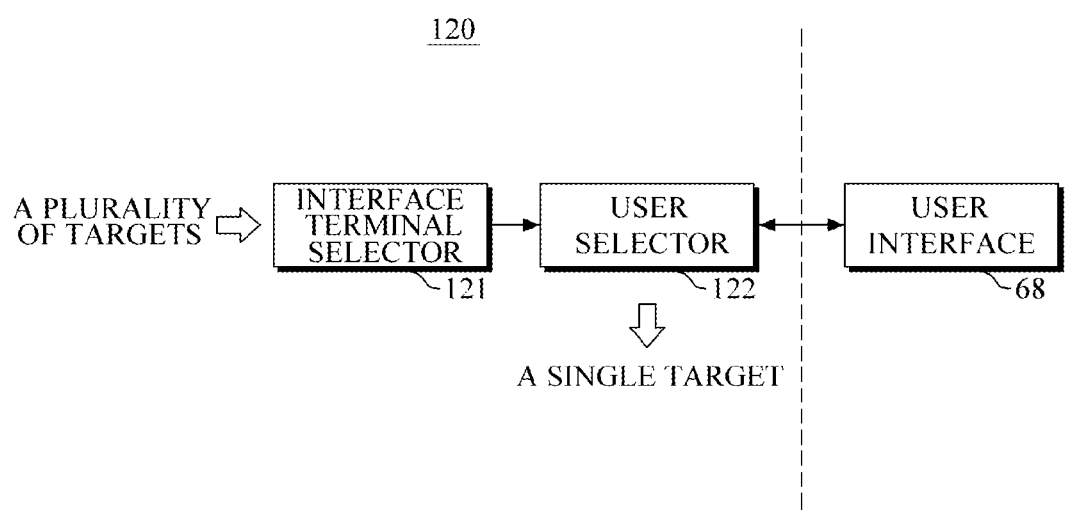
FIG. 12 is a block diagram illustrating an example of a target determiner in a speech recognition system.

FIG. 12 is a block diagram illustrating an example of a target determiner in a speech recognition system.

Referring to FIG. 12, an example of a target determiner 120 is illustrated, which determines one target according to a user's selection from among a plurality of targets. The target determiner 120 may include components, such as an interface terminal selector 121, and a user selector 122. However, it is noted that the target determiner 120 may include more or less components than those illustrated in FIG. 12 and thus is not limited thereto.

The interface terminal selector 121 selects one terminal as an interface terminal from among terminals that include user interfaces by reference to terminal identification information pre-stored in a server. For example, as a server has already identified distances between a speaker and each of the terminals in the speech recognition, it is possible to select as an interface terminal a terminal that is located closest to a speaker among terminals that include user interfaces.

The user selector 122 may transmit, to the selected interface terminal, a request for selecting a target desired by a user from among a plurality of targets to display the request. A user may select a target by touching an item with a finger among target items displayed on a screen, or by inputting a select command through speech in response to a verbal request for selection. Then, the user interface 68 of the interface terminal may transmit a user's selection to the user selector 122 of a server. Once a target is determined, the user selector 122 may transmit speech to a target selected by a user.

Hereinafter, examples of a speech recognition method will be described with reference to FIGS. 13 to 17. These examples are merely illustrative, and one of ordinary skill in the art would easily understand that other methods may be provided in various combinations within the scope of the following claims. When executed by a processor of a computing device, the whole or part of the speech recognition method may be coded by a computer-executable command, a module, software, data, an algorithm, a procedure, a plugin, or the like, to perform a specific task. The computer-executable command and the like may be coded by a software developer in such a programming language as, for example, BASIC, Fortran, C, C++, or the like, to be compiled in a machine language.

Figure 13:
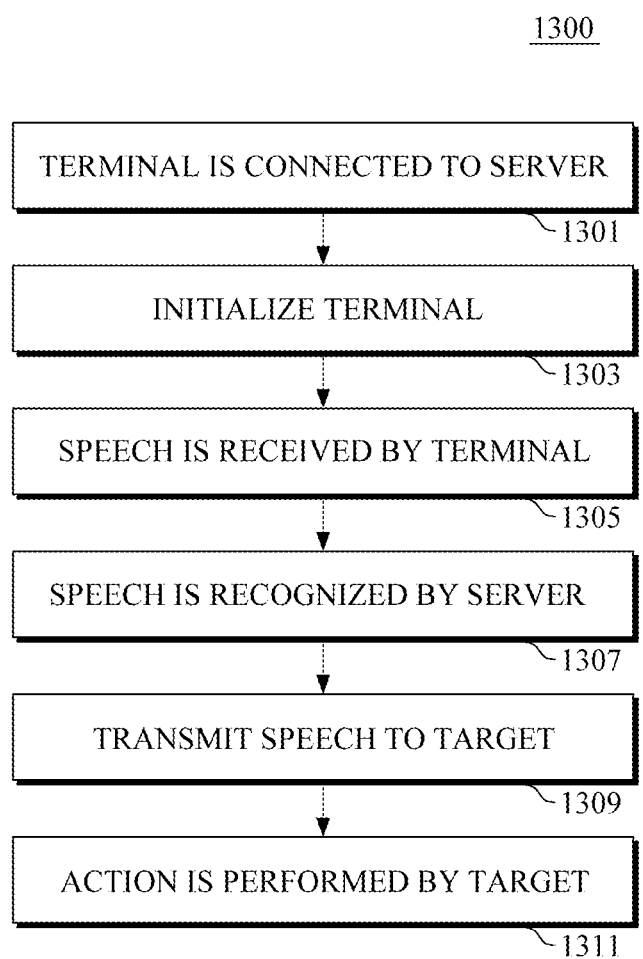
FIG. 13 is a flowchart illustrating an example of a speech recognition method.

FIG. 13 is a flowchart illustrating an example of a speech recognition method.

Referring to FIG. 13, a speech recognition method 1300 is illustrated, which may be performed by the speech recognition system 20 illustrated in FIG. 2.

Once a terminal is connected to a server in operation 1301, initialization of the terminal in operation 1303 is performed. The initialization in operation 1303 may include registering identification information, and location information, of a terminal; and synchronizing time of the server and the terminal.

Subsequently, speech may be received by the terminal from a speaker in operation 1305. In this case, although there is only one server, there may be a plurality of terminals connected to the server. Speech sound received by the terminal may be converted into a speech signal, transmitted to the server, and may be recognized as a command for a specific target in operation 1307.

Then, speech signals that indicate speech recognition results or speech commands are transmitted from the server to a target in operation 1309, and the target may perform a specific action corresponding to the received signal in operation 1311.

Recognizing a speech signal by the server in operation 1307, by integrating speech signals transmitted from a plurality of terminals, may include integrating speech signals according to times of arrival when speech sound reaches the terminals from a speaker. In other words, the server calculates times of arrival when speech reaches each of the terminals from a speaker, calculates distances between a speaker and each of the terminals based on the calculated times of arrival, and applies different weighted values to speech signals transmitted from each of the terminals according to the calculated distances, to integrate the speech signals.

In the speech recognition method 1300, speech made by a speaker is not directly received and recognized by a target, but is received by a plurality of terminals that are positioned at separate locations near a speaker and a target, and the received speech is integrated and recognized by a server based on times of arrival when the speech reaches the terminals from the speaker to be transmitted to a target. Accordingly, a speech command transmitted to the target may be accurately recognized regardless of a distance between a target and a speaker.

Hereinafter, the speech recognition method 1300 of FIG. 13 will be described in further detail with reference to FIGS. 14 to 17, which includes an initialization process, a speech receiving process, a speech recognition process, and a target selecting process.

Figure 14:
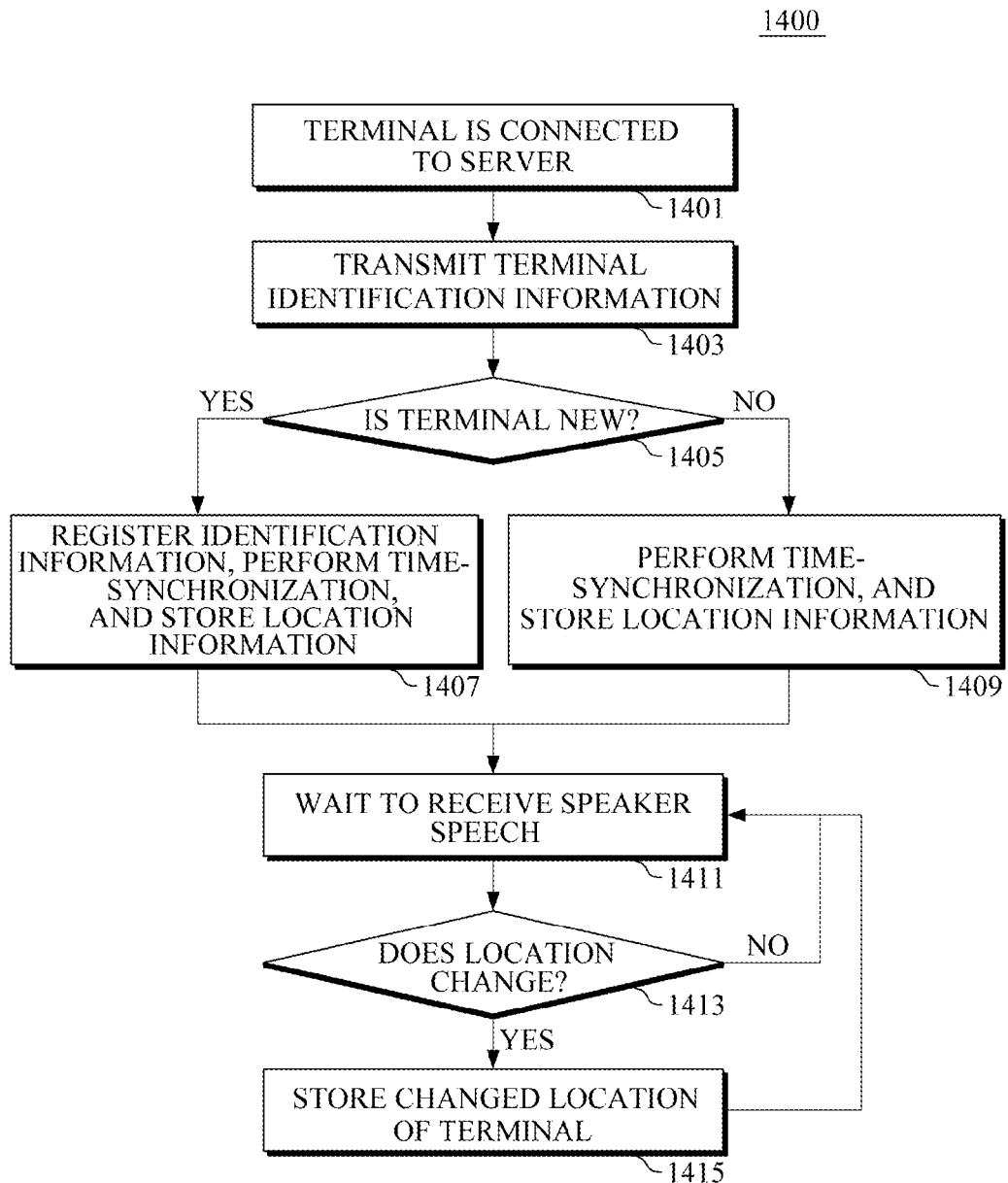
FIG. 14 is a flowchart illustrating an example of a terminal initialization process of a speech recognition method.

FIG. 14 is a flowchart illustrating an example of a terminal initialization process in a speech recognition method. Referring to FIG. 14, the initialization 1400 is illustrated, which may be performed after a terminal is connected to a server.

In the initialization 1400, once a terminal is connected to a server in operation 1401, the terminal may transmit its own identification information to the server in operation 1403. The server compares the received identification information to pre-stored identification information of the terminal to determine whether the terminal is a new terminal or a registered terminal in operation 1405.

If the terminal is a registered terminal, time synchronization is performed to store location information of the terminal in operation 1409. If the terminal is a new terminal, identification information of the new terminal is stored, and time-synchronization is performed, to store location information of the terminal in operation 1407. Identification information and location information of terminals may be similar to those described above with reference to FIGS. 7 to 9.

Subsequently, the terminal may be in a state waiting to receive a speaker's speech in operation 1411. If the terminal is a mobile device, its locations may be changeable, such that location changes may be checked regularly in operation 1413. If a location is changed, current location information is updated to changed location information in operation 1415, and the terminal may return to a waiting state for receiving speech.

Although FIG. 14 illustrates only the initialization of a terminal, not only a terminal, but a target may also be connected to a server. Once a device is connected to a server, the device may transmit its own identification information to the server. Then, the server may identify whether the device is a terminal or a target, or both based on the device identification information. If the device is a terminal, initialization may be performed as illustrated in FIG. 14. If the device is a target, initialization of the target may be performed in which target command information that indicates a speech command to control the target is received from the target to be registered. Unlike the initialization of terminals, the target initialization is neither required to register location information nor perform time synchronization. Further, it is evident that if the device acts as a target and a terminal, both the initialization and the target initialization need to be performed.

Figure 15:
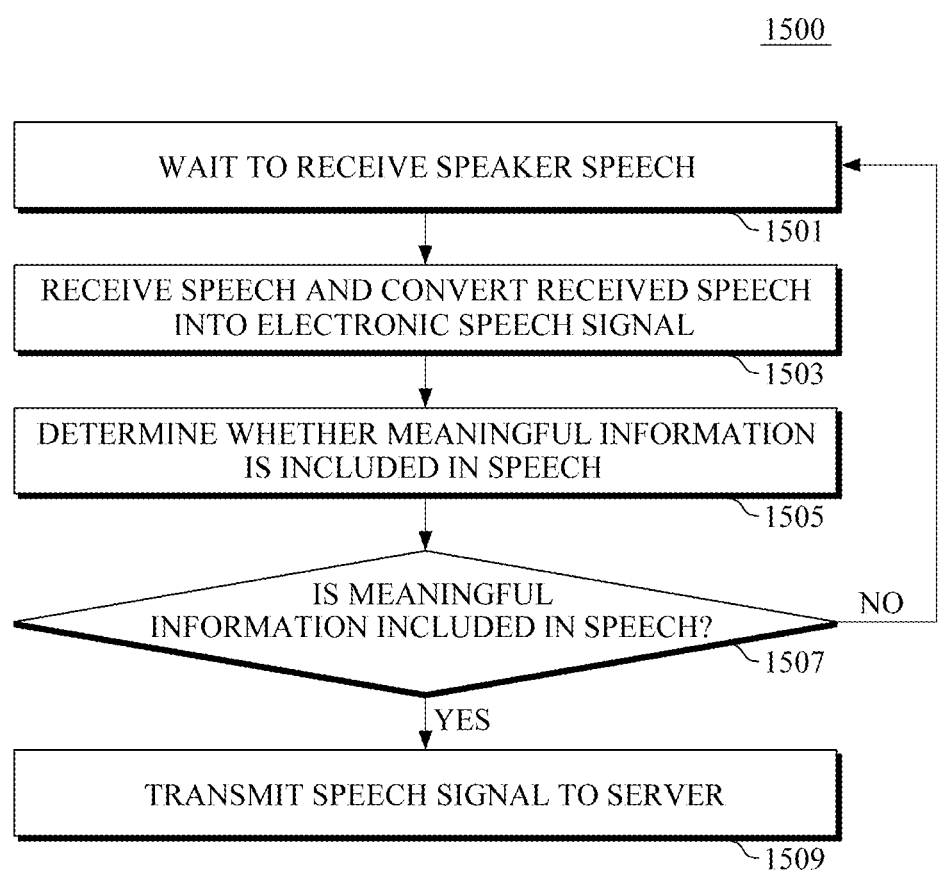
FIG. 15 is a flowchart illustrating an example of a speech receiving process of a speech recognition method in a terminal.

FIG. 15 is a flowchart illustrating an example of a speech receiving process of a speech recognition method in a terminal. Referring to FIG. 15, a speech receiving process 1500 is illustrated in which terminals receive speech from a speaker.

In the speech receiving process 1500, once a terminal receives speech sound after waiting to receive the speech sound from a speaker in operation 1501, the received speech sound is converted into an electronic speech signal in operation 1503. Such conversion may be performed by a microphone that converts a physical pressure signal into an electronic signal at the same time when the speech is received.

Subsequently, a speech signal is processed in a terminal to determine whether the speech signal includes meaningful information in operation 1505 and in operation 1507. If the speech signal includes meaningful information (Yes in operation 1507), the terminal may transmit the speech signal, which is in the form of an electronic signal, to the server through a wired or wireless communication network in operation 1509. If it is determined that the speech signal does not include meaningful information (No in operation 1507), the speech signal is not transmitted to the server, and the terminal may return to a waiting state to receive speech in operation 1501.

Figure 16:
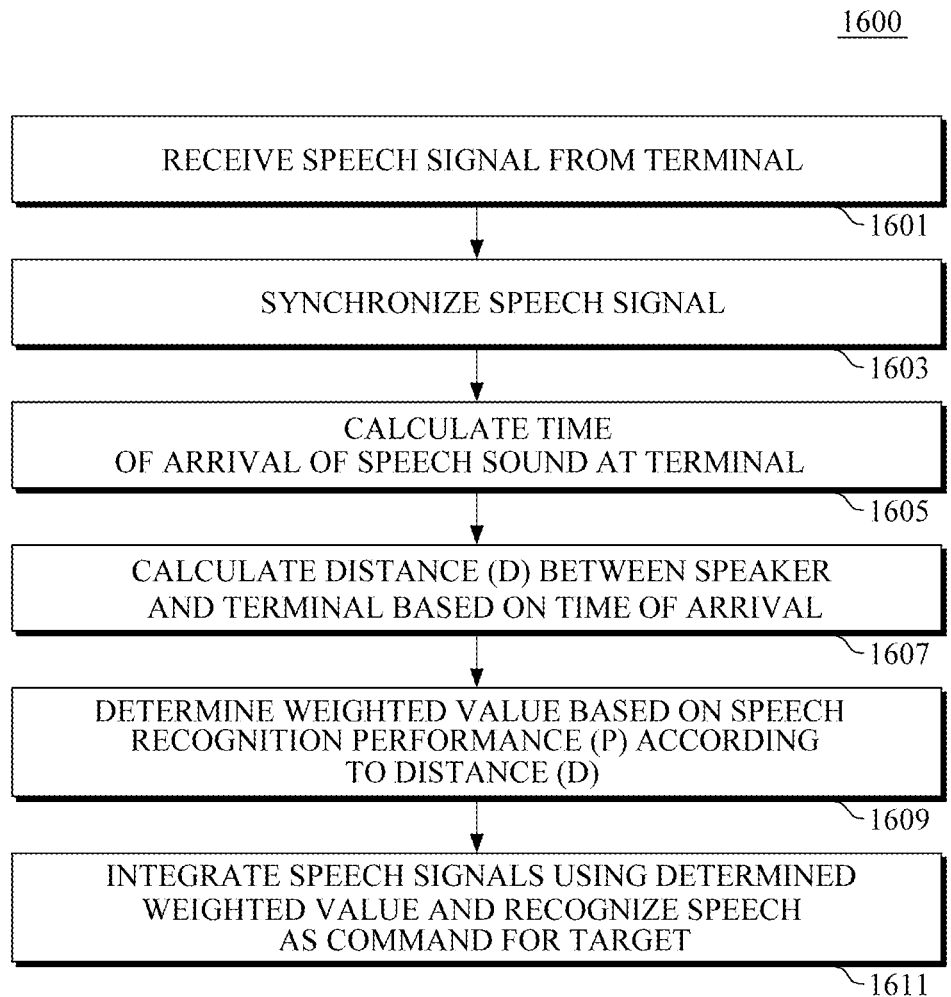
FIG. 16 is a flowchart illustrating an example of a speech recognition process of a speech recognition method in a server.

FIG. 16 is a flowchart illustrating an example of a speech recognition process of a speech recognition method in a server. Referring to FIG. 16, the speech recognition process 1600 shows a server receiving transmitted speech signals from a plurality of terminals, integrating and recognizing the transmitted speech signals.

In the speech recognition process 1600, the server receives speech signals from a plurality of terminals at operation 1601. The server synchronizes the transmitted speech signals in operation 1603, and calculates time of arrival of the speech sound at the terminal when the speech sound reaches the terminals from a speaker in operation 1605. Then, based on the time of arrival, distances (D) between a speaker and the terminals may be calculated in operation 1607. A weighted value is determined based on the distances (D) in operation 1609, and a speech signal may be recognized as a command to control a specific target by using the weighted value in operation 1611.

In an embodiment, the speech recognition process in operation 1611 includes: integrating, in the server, speech signals received in operation 1609 from each of the terminals by using the determined weighted value; and recognizing a speech command based on the integrated speech signals. In an alternative embodiment, the speech recognition process in operation 1611 includes: recognizing, in the server, speech from each speech signal received from each of the terminals; and integrating speech recognition results by using a weighted value determined in operation 1609 to recognize a speech command.

Figure 17:
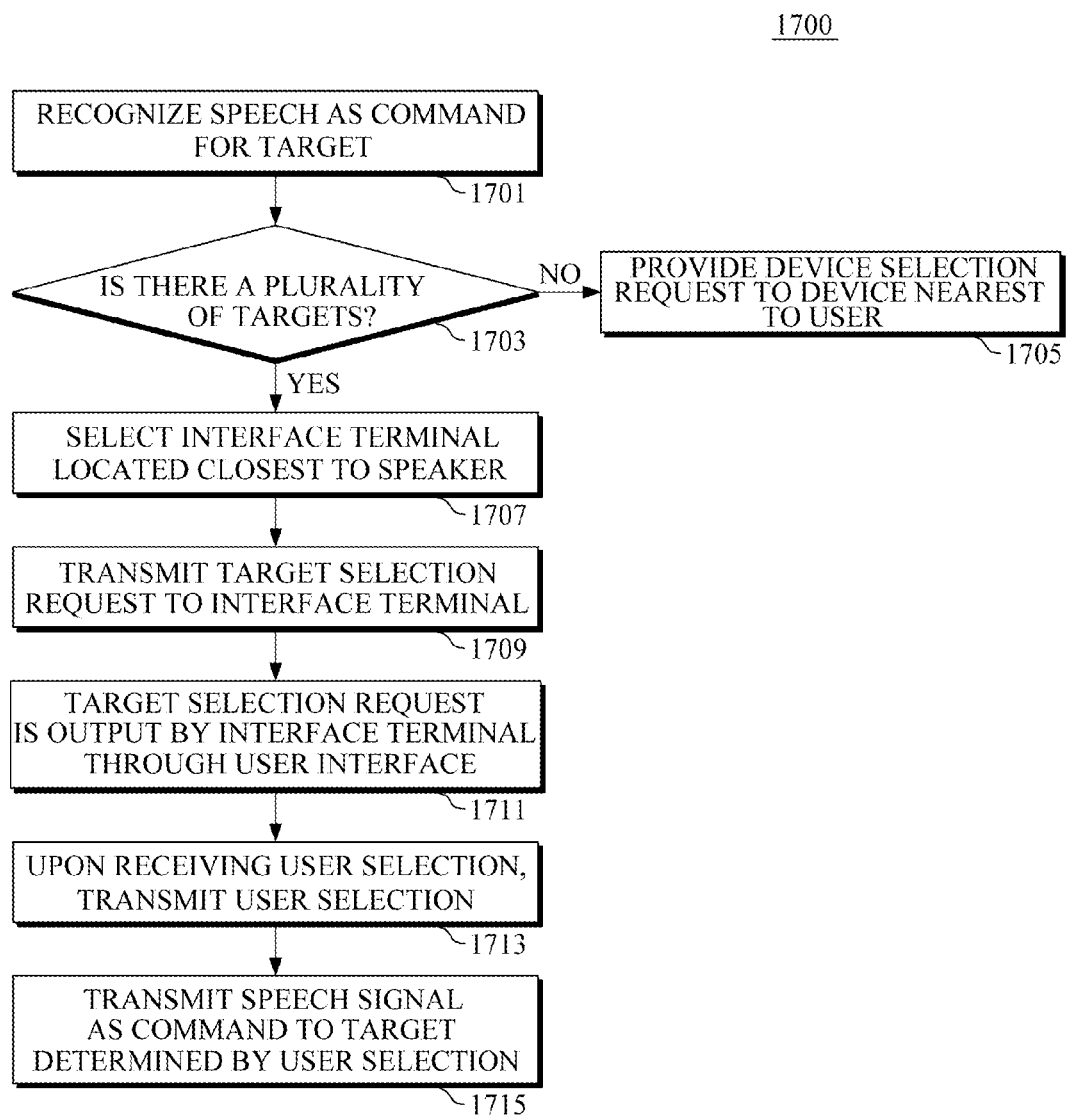
FIG. 17 is a flowchart illustrating an example of a target determination process of a speech recognition method in a server.

FIG. 17 is a flowchart illustrating an example of a target determination process of a speech recognition method in a server. Referring to FIG. 17, the target determination process 1700 is illustrated in further detail in which after a server recognizes speech as a command, a target is determined by a user's selection if there is a plurality of targets.

In the target determination process 1700, a server may recognize speech as a command to control a target in operation 1701 and may determine the number of targets and whether there is a plurality of targets in operation 1703. If there is a single target (No in operation 1703), rather than a plurality thereof, the server transmits the command to the single target and provides a device selection request to a device nearest to a user in operation 1705.

If there are a plurality of targets (Yes in operation 1703), a server may select a terminal to provide the user interface to display information related to the plurality of the targets in operation 1707 as described above with reference to FIG. 12. The server may refer to terminal identification information stored therein to identify terminals that include user interfaces. Further, the server may identify distances between a speaker and terminals that receive speech in the speech recognition. In most cases, terminals, which are located close to a speaker (i.e., a user), are likely to be terminals that receive speech. Accordingly, the server may enable the user to select a desired target and to transmit the command to the selected target according to the user's selection through the interface of the selected terminal. A user may select a terminal, which includes a user interface, as an interface terminal from among terminals located near the user.

Once an interface terminal is selected, the server may transmit, to the selected interface terminal, information that requests a user to select a target they desire to control from among a plurality of targets in operation 1709. In response to receiving the request information, the interface terminal may output the received request information to a user through a user interface in operation 1711.

The user interface checks information displayed on the interface terminal, and may input a command to select a desired target into the user interface of the interface terminal. Then, the interface terminal may transmit a user's selection to the server in operation 1713. Upon receiving the selection, the server may transmit speech signal as a command to a target determined by the user's selection in operation 1715.

In the speech recognition method described above, for example in the living room environment in FIG. 1A, a user makes a speech input as a speech command to control the TV 11; however, a server executed in the set-top box 19 may recognize that this speech command is not only for the TV 11 but also for the tablet PC 18. In this case, the server may select the smartphone 16 as an interface terminal from among terminals located near the user. Accordingly, a prompt may be displayed to a user (U) on a screen of the smartphone 16, requesting the user (U) to select one target between a TV and a laptop computer 17. The user may select a TV 11 as a target by touching a TV item between items of a TV 11 and a laptop computer 17 displayed on the screen of the smartphone 16. Then, speech recognized in the set-top box 19, which is a server, is transmitted to the TV 11, and an action corresponding to the received user's speech command may be performed by the TV 11.

The above-described components of the speech recognition system may be embodied as hardware that includes a circuit configured to perform specific functions. Alternatively, the components of the speech recognition system may be embodied as a combination of components of hardware, firmware, or software of a computing device that may include a processor, a memory, a user input device, and/or a presentation device, and the like. The memory is a non-transitory computer readable storage medium which stores computer-executable software, applications, program modules, routines, instructions, and/or data, and the like, which are coded to perform specific tasks when executed by a processor. The processor may read and execute computer-executable software, applications, program modules, routines, instructions, and/or data, and the like. The user device may be a device which enables a user to input instructions into the processor to perform a specific task, or to input data necessary for execution of a specific task. The user input device may include a physical or virtual keyboard, a keypad, a key button, a joystick, a trackball, a touch-sensitive input device, a microphone, or the like. The presentation device may include a display, a printer, a speaker, a vibrator, or the like.

Steps, operations, and processes of the above-described speech recognition method may be executed by hardware that includes a circuit configured to perform specific functions. Alternatively, the speech recognition method may be embodied by being coded as a computer-executable instructions and executed by a processor of a computing device. The computer-executable instruction may include software, applications, modules, plug-ins, programs, instructions, and/or data structures, and the like. The computer-executable instructions may be included on a computer-readable medium. The computer-readable instructions may include a computer-readable storage medium and a computer-readable communication medium. The computer-readable storage medium may include random access memory (RAM), flash memory, optical disks, magnetic disks, magnetic tape, magnetic cassettes, hard disks, solid state disks, and the like. The computer-readable communication medium may include computer-executable instructions having a diagnosis method coded thereon, which are coded as signals that may be transmitted and received through a communication network.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A speech recognition server, comprising:
   a network connector configured to connect to terminals through a communication network; and
   a processor configured to
   calculate times of arrival of a speech sound at each of the terminals using speech signals received from each of the terminals,
   calculate distances between a user and the terminals based on the times of arrival of the speech sound to each of the terminals,
   apply a weighted value determined based on the calculated distances to the speech recognition result of each of the terminals,
   generate a final speech recognition result by integrating speech recognition results of each of the terminals for which the weighted value is applied, and
   recognize a command to control a target based on the generated final speech recognition results.

2. The server of claim 1, wherein the server transmits the command to the target.

3. The server of claim 1,
   wherein the server is configured to determine a number of targets;
   when there is a single target, transmit the command to the single target; and
   when there are a plurality of targets, select one of the terminals to provide a user interface to display information related to the plurality of targets and to enable the user to select the target, and to transmit the command to the target according to the user's selection through the user interface.

4. The server of claim 3, wherein the server is further configured to select one of the terminals as the target.

5. The server of claim 3, wherein the server is further configured to select a terminal that is positioned at a nearest location from the user as an interface terminal.

6. The server of claim 3, wherein the user interface of the selected terminal is either a visual or an acoustic interface.

7. The server of claim 1, wherein the server is further configured to receive a location of each of the terminals after each of the terminals is connected to the server.

8. The server of claim 7, wherein the server is further configured to receive information on a changed location of each of the terminals once a change of location of each of the terminals is sensed by a sensor installed in each of the terminals.

9. The server of claim 1, wherein the server is further configured to determine a location of each of the terminals by input of a user, by being sensed by a sensor installed in each of the terminals, or by using a signal for distance measurement.

10. The server of claim 1, wherein the server is further configured to determine a weighted value used for integrating the speech signals according to distances between the user and the terminals based on speech recognition performance according to the distances between the user and the terminals.

11. A speech recognition method comprising:
    connecting terminals through a communication network to a server;
    calculating times of arrival of a speech sound at each of the terminals using speech signals received from each of the terminals;
    calculating distances between a user and the terminals based on the times of arrival of the speech sound to each of the terminals;
    applying a weighted value determined based on the calculated distances to the speech recognition result of each of the terminals;
    generating a final speech recognition result by integrating each of the terminals that the weighted value is applied; and
    recognizing a command to control a target based the generated final recognition results.

12. The method of claim 11, further comprising transmitting, by the server, the command to the target.

13. The method of claim 11, further comprising determining a number of targets;
    when there is a single target, transmitting the command to the single target; and
    when there are a plurality of targets, selecting one of the terminals to provide a user interface to display information related to the plurality of targets and to enable the user to select a target, and transmitting the command to the selected target according to the user's selection through the user interface of the selected terminal.

14. The method of claim 13, wherein one of the terminals is selected as the target.

15. The method of claim 13, wherein in the selection of one of the terminals to provide the user interface, a terminal that is positioned at a nearest location from the user is selected as the terminal to provide the user interface.

16. The method of claim 13, wherein the user interface of the terminal to provide the user interface is either a visual or an acoustic interface.

17. The method of claim 11, wherein a location of each of the terminals is transmitted to the server during initialization.

18. The method of claim 17, wherein among the terminals, at least one terminal is a mobile device, and once a location change of the mobile device is sensed by a sensor installed in the mobile device, the mobile device transmits information on the changed location to the server.

19. The method of claim 11, wherein location of each of the terminals is determined by input of a user, by being sensed by a sensor installed in each of the terminals, or by using a signal for distance measurement.

20. The method of claim 19, wherein a weighted value used for integrating speech signals according to distances between the user and the terminals is determined based on speech recognition performance according to the distances between the user and the terminals.

21. A server comprising a processor configured to:
synchronize speech signals transmitted from terminals;
calculate a time of arrival of a speech sound at the terminals when the speech sound reaches the terminals based on the synchronized speech signals;
calculate distances between an individual and the terminals based on times of arrival when the speech sound reaches the terminals;
determine a weighted value to be applied to the speech signals according to the distances between the individual and the terminals;
generate an integrated speech signal by applying the weighted value to the speech signals transmitted from the terminals and by integrating the speech signals; and
recognize a command to control a target based on the generated final speech recognition results.

* * * * *